US012475133B2

(12) United States Patent  
Coletta et al.

(10) Patent No.: US 12,475,133 B2  
(45) Date of Patent: Nov. 18, 2025

(54) METHOD AND SYSTEM FOR MULTI-MODAL TIME-SERIES RETRIEVAL THROUGH LATENT SPACE PROJECTIONS

(71) Applicant: JPMorgan Chase Bank, N.A., New York, NY (US)

(72) Inventors: Andrea Coletta, Ferentino (IT); Elizabeth Fons, London (GB); Sriram Gopalakrishnan, West New York, NJ (US); Svitlana Vyetrenko, Berkeley, CA (US); Tucker Richard Balch, Suwanee, GA (US); Manuela Veloso, New York, NY (US); Tom Bamford, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 57 days.

(21) Appl. No.: 18/527,945

(22) Filed: Dec. 4, 2023

(65) Prior Publication Data

US 2025/0181596 A1  Jun. 5, 2025

(51) Int. Cl.
*G06F 16/24* (2019.01)
*G06F 16/2458* (2019.01)
*G06F 40/30* (2020.01)

(52) U.S. Cl.
CPC .......... *G06F 16/2477* (2019.01); *G06F 40/30* (2020.01)

(58) Field of Classification Search
None
See application file for complete search history.

(56) References Cited

U.S. PATENT DOCUMENTS

2021/0256485 A1\* 8/2021 Fidanza ............ G06Q 30/0201
2022/0121884 A1\* 4/2022 Zadeh ................... G06N 3/006
2022/0366440 A1\* 11/2022 Shinde .............. G06Q 30/0204

OTHER PUBLICATIONS

Markus Reichstein; Deep learning and process understanding for data-driven Earth system science; Nature; vol. 566; pp. 195-204 (Year: 2019).\*

\* cited by examiner

*Primary Examiner* — Albert M Phillips, III
*Assistant Examiner* — Jermaine A Mincey
(74) *Attorney, Agent, or Firm* — GREENBLUM & BERNSTEIN, P.L.C.

(57) ABSTRACT

A method and a system for using multi-modal time-series data retrieval through latent space projections to efficiently capture and store time-series data are provided. The method includes: generating a synthetic set of time-series data and a corresponding set of textual descriptions; using the synthetic data to generate a corresponding set of images; using the images to train an image encoder to learn a first multi-modal shared latent space, and using the textual descriptions to train a text encoder to learn the shared latent space; receiving historical time-series data and storing the historical data in a database; generating an index that relates to the shared latent space and is usable for identifying information stored in the database; receiving a user query that relates to a first new set of time-series data; and retrieving, from the database, information that is responsive to the query.

17 Claims, 5 Drawing Sheets

METHOD AND SYSTEM FOR MULTI-MODAL TIME-SERIES RETRIEVAL THROUGH LATENT SPACE PROJECTIONS

BACKGROUND

1. Field of the Disclosure

This technology generally relates to methods and systems for capturing time-series data, and more particularly to methods and systems for using multi-modal time-series data retrieval through latent space projections to efficiently capture and store time-series data.

2. Background Information

The increasing usage of data-hungry applications, including artificial intelligence/machine learning (AI/ML) algorithms, has brought significant changes to storage systems required to accommodate the growing volume, velocity, variety of data and queries. In particular, financial firms are required to process and store billions of time-series (TS). These TS are stored to satisfy compliance requirements, to provide business and clients with historical data, and to support data-driven algorithms. Such TS are frequently accessed with varying requirements, and correspondingly, queries. To support efficient data storage and retrieval, specialized TS databases and systems have emerged. While these databases support efficient indexing and querying of TS, they do not directly target two important aspects of financial TS: the intrinsic complexity of high-frequency financial data; and the required retrieval modalities and difficulty for the end users. In fact, such databases commonly offer queries based on some fixed set of properties and using SQL style queries; for example, "Stocks with daily price returns ≤5%". However, statistical properties of real price series can be non-trivial and challenging for users to express in such rigid formats. Therefore, financial users would require a fast and easy range of query modalities that facilitate the input of financial TS features, called stylized facts (e.g., volatility or auto-correlation of prices).

Some academic work proposes methods to: analyze and retrieve massive heterogeneous datasets; manage TS data streams from Internet of Things (IoT) devices; or find uncommon and interesting patterns with respect to historical databases. However, these works focus on their specific applications or problems. They do not target or apply to financial TS, which have their own specific statistical properties and requirements.

Accordingly, there is a need for a mechanism for using multi-modal time-series data retrieval through latent space projections to efficiently capture and store time-series data for subsequent retrieval.

SUMMARY

The present disclosure, through one or more of its various aspects, embodiments, and/or specific features or sub-components, provides, inter alia, various systems, servers, devices, methods, media, programs, and platforms for methods and systems for using multi-modal time-series data retrieval through latent space projections to efficiently capture and store time-series data.

According to an aspect of the present disclosure, a method for using multi-modal time-series data retrieval through latent space projections to efficiently capture and store time-series data is provided. The method is implemented by at least one processor. The method includes: generating, by the at least one processor, a synthetic set of time-series data and a corresponding set of textual descriptions; generating, by the at least one processor, a respective set of images by using the synthetic set of time-series data; training, by the at least one processor, an image encoder to learn a first multi-modal shared latent space by using the images; training, by the at least one processor, a text encoder to learn the first multi-modal shared latent space by using the textual descriptions; receiving, by the at least one processor, historical time-series data and storing the historical time-series data in a database; generating, by the at least one processor, an index that relates to the first multi-modal shared latent space and is usable for identifying information stored in the database; receiving, from a user by the at least one processor, a query that relates to a first new set of time-series data; and retrieving, from the database by the at least one processor, information that is responsive to the query by using the image encoder, the text encoder, and the index.

The generating of the synthetic set of time-series data may include characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

The generating of the corresponding set of textual descriptions may include associating a respective numerical value of each parameter with a corresponding descriptive sentiment.

The corresponding descriptive sentiment may be retrieved from a first dataset that is generated by inputting, into a first large-language model (LLM), a plurality of predetermined sentences within which at least one parameter from among the first parameter, the second parameter, the third parameter, the fourth parameter, the fifth parameter, and the sixth parameter is paired with a predetermined descriptive sentiment, together with a request for the first LLM to generate phrases that are semantically similar to each respective sentence included in the plurality of predetermined sentences; and using an output from the first LLM that includes a response to the request to populate the first dataset.

The plurality of predetermined sentences may include at least one from among a first sentence within which a near-zero numerical value for the fourth parameter that relates to the trend value is paired with at least one from among "neutral", "horizontal", "non-increasing", "flat", "stable", and "unchanged"; a second sentence within which a positive numerical value for the fourth parameter that relates to the trend value is paired with at least one from among "upward", "growing", "positive", "increasing", "rising", "climbing", and "advancing"; and a third sentence within which a negative numerical value for the fourth parameter that relates to the trend value is paired with at least one from among "declining", "falling", "sliding", "sinking", "plummeting", and "downward".

The plurality of predetermined sentences may include at least one from among a fourth sentence within which a relatively high numerical value for the third parameter that relates to the covariance of random noise added to the corresponding time-series is paired with at least one from among "has strong variability", "has significant variations", "has aggressive variations", "is unstable", "has high fluctuation", "is noisy", and "is variable"; and a fifth sentence within which a relatively low numerical value for the third parameter that relates to the covariance of random noise added to the corresponding time-series is paired with at least one from among "has small volatility", "has slight variability", "has negligible volatility", "has low volatility", and "remains stable".

The query may include first information that relates to a trend of the first new set of time-series data and second information that relates to a volatility of the first new set of time-series data.

The query may include at least one from among a text-based query that includes a plurality of words and an image-based query that includes a drawing that is generated by the user and includes a graphical depiction that illustrates the first information that relates to the trend of the first new set of time-series data and the second information that relates to the volatility of the first new set of time-series data.

The first new set of time-series data may include stock price data.

According to another exemplary embodiment, a computing apparatus for using multi-modal time-series data retrieval through latent space projections to capture time-series data is provided. The computing apparatus includes a processor; a memory; and a communication interface coupled to each of the processor and the memory. The processor is configured to: generate a synthetic set of time-series data and a corresponding set of textual descriptions; generate a respective set of images by using the synthetic set of time-series data; train an image encoder to learn a first multi-modal shared latent space by using the images; train a text encoder to learn the first multi-modal shared latent space by using the textual descriptions; receive, via the communication interface, historical time-series data and store the historical time-series data in a database within the memory; generate an index that relates to the first multi-modal shared latent space and is usable for identifying information stored in the database; receive, from a user via the communication interface, a query that relates to a first new set of time-series data; and retrieve, from the database, information that is responsive to the query by using the image encoder, the text encoder, and the index.

The processor may be further configured to generate the synthetic set of time-series data by characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

The processor may be further configured to generate the corresponding set of textual descriptions by associating a respective numerical value of each parameter with a corresponding descriptive sentiment.

The processor may be further configured to generate a first dataset from which each corresponding descriptive sentiment is retrievable by inputting, into a first large-language model (LLM), a plurality of predetermined sentences within which at least one parameter from among the first parameter, the second parameter, the third parameter, the fourth parameter, the fifth parameter, and the sixth parameter is paired with a predetermined descriptive sentiment, together with a request for the first LLM to generate phrases that are semantically similar to each respective sentence included in the plurality of predetermined sentences; and using an output from the first LLM that includes a response to the request to populate the first dataset.

The plurality of predetermined sentences may include at least one from among a first sentence within which a near-zero numerical value for the fourth parameter that relates to the trend value is paired with at least one from among "neutral", "horizontal", "non-increasing", "flat", "stable", and "unchanged"; a second sentence within which a positive numerical value for the fourth parameter that relates to the trend value is paired with at least one from among "upward", "growing", "positive", "increasing", "rising", "climbing", and "advancing"; and a third sentence within which a negative numerical value for the fourth parameter that relates to the trend value is paired with at least one from among "declining", "falling", "sliding", "sinking", "plummeting", and "downward".

The plurality of predetermined sentences may include at least one from among a fourth sentence within which a relatively high numerical value for the third parameter that relates to the covariance of random noise added to the corresponding time-series is paired with at least one from among "has strong variability", "has significant variations", "has aggressive variations", "is unstable", "has high fluctuation", "is noisy", and "is variable"; and a fifth sentence within which a relatively low numerical value for the third parameter that relates to the covariance of random noise added to the corresponding time-series is paired with at least one from among "has small volatility", "has slight variability", "has negligible volatility", "has low volatility", and "remains stable".

The query may include first information that relates to a trend of the first new set of time-series data and second information that relates to a volatility of the first new set of time-series data.

The query may include at least one from among a text-based query that includes a plurality of words and an image-based query that includes a drawing that is generated by the user and includes a graphical depiction that illustrates the first information that relates to the trend of the first new set of time-series data and the second information that relates to the volatility of the first new set of time-series data.

The first new set of time-series data may include stock price data.

According to yet another exemplary embodiment, a non-transitory computer readable storage medium storing instructions for using multi-modal time-series data retrieval through latent space projections to capture time-series data is provided. The storage medium includes executable code which, when executed by a processor, causes the processor to: generate a synthetic set of time-series data and a corresponding set of textual descriptions; generate a respective set of images by using the synthetic set of time-series data; train an image encoder to learn a first multi-modal shared latent space by using the images; train a text encoder to learn the first multi-modal shared latent space by using the textual descriptions; receive historical time-series data and store the historical time-series data in a database; generate an index that relates to the first multi-modal shared latent space and is usable for identifying information stored in the database; receive, from a user, a query that relates to a first new set of time-series data; and retrieve, from the database, information that is responsive to the query by using the image encoder, the text encoder, and the index.

When executed by the processor, the executable code may further cause the processor to generate the synthetic set of time-series data by characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
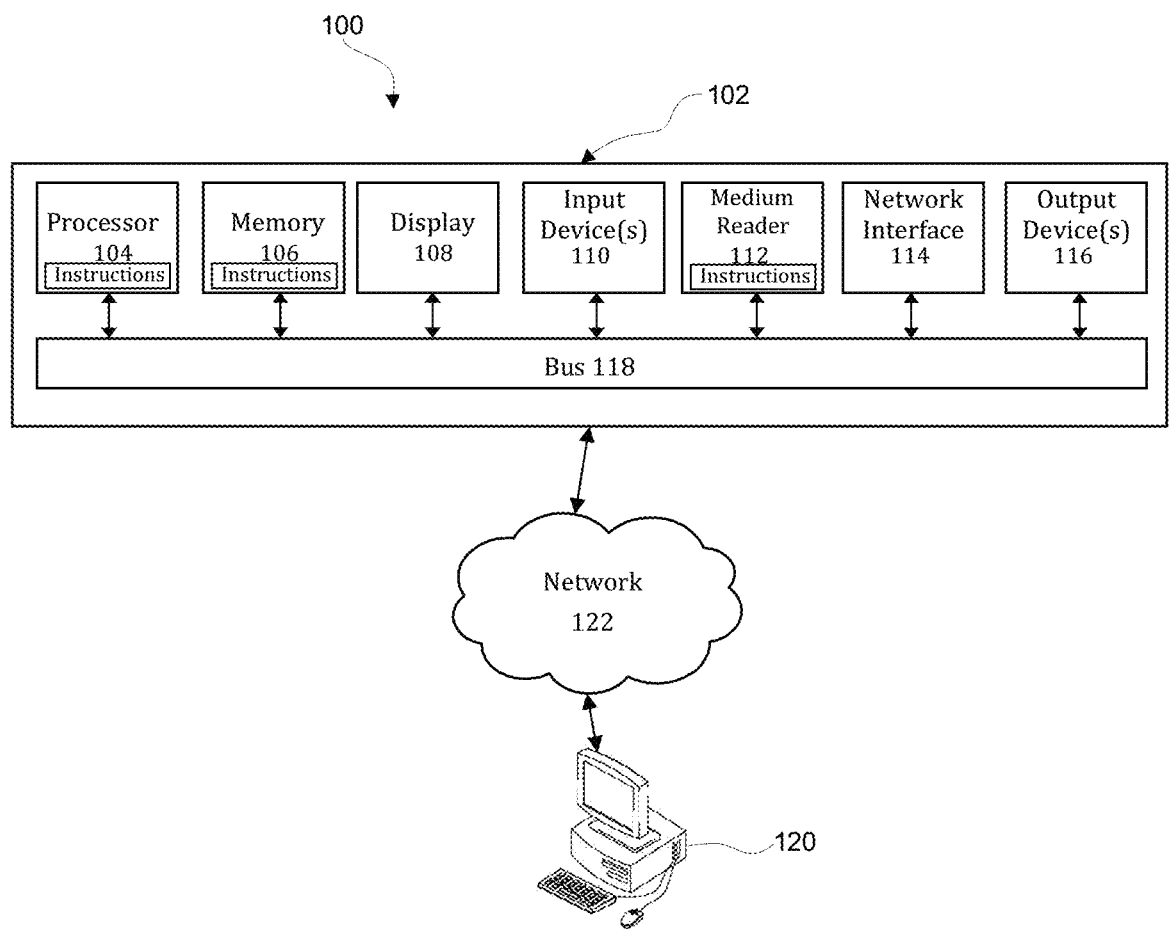
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using multi-modal time-series data retrieval through latent space projections to efficiently capture and store time-series data.

Figure 2:
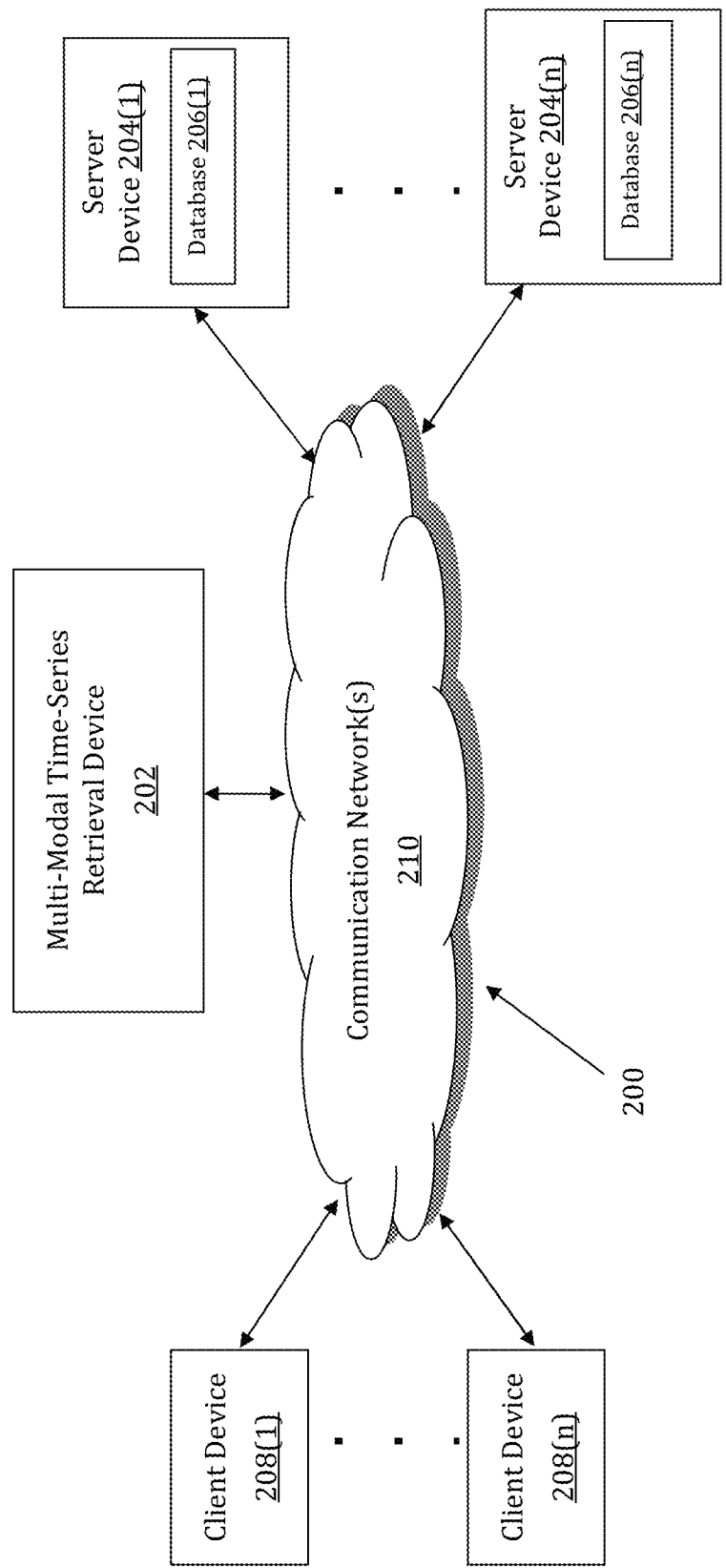
FIG. 2 illustrates an exemplary diagram of a network environment.

Referring to FIG. 2, a schematic of an exemplary network environment 200 for implementing a method for using multi-modal time-series data retrieval through latent space projections to efficiently capture and store time-series data is illustrated. In an exemplary embodiment, the method is executable on any networked computer platform, such as, for example, a personal computer (PC).

The method for using multi-modal time-series data retrieval through latent space projections to efficiently capture and store time-series data may be implemented by a Multi-Modal Time-Series Retrieval (MMTSR) device 202. The MMTSR device 202 may be the same or similar to the computer system 102 as described with respect to FIG. 1. The MMTSR device 202 may store one or more applications that can include executable instructions that, when executed by the MMTSR device 202, cause the MMTSR device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MMTSR device 202 itself, may be located in virtual server(s) running in a cloud-based computing environment rather than being tied to one or more specific physical network computing devices. Also, the application(s) may be running in one or more virtual machines (VMs) executing on the MMTSR device 202. Additionally, in one or more embodiments of this technology, virtual machine(s) running on the MMTSR device 202 may be managed or supervised by a hypervisor.

In the network environment 200 of FIG. 2, the MMTSR device 202 is coupled to a plurality of server devices 204(1)-204(n) that hosts a plurality of databases 206(1)-206(n), and also to a plurality of client devices 208(1)-208(n) via communication network(s) 210. A communication interface of the MMTSR device 202, such as the network interface 114 of the computer system 102 of FIG. 1, operatively couples and communicates between the MMTSR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MMTSR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MMTSR devices that efficiently implement a method for using multi-modal time-series data retrieval through latent space projections to efficiently capture and store time-series data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MMTSR device 202 may be a standalone device or integrated with one or more other devices or apparatuses, such as one or more of the server devices 204(1)-204(n), for example. In one particular example, the MMTSR device 202 may include or be hosted by one of the server devices 204(1)-204(n), and other arrangements are also possible. Moreover, one or more of the devices of the MMTSR device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MMTSR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical time series data and data that relates to performance metrics for time series retrieval accuracy and diversity.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MMTSR device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the MMTSR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MMTSR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MMTSR device 202, the server devices 204(1)-204(n), or the client devices 208(1)-208(n), for example, may be configured to operate as virtual instances on the same physical machine. In other words, one or more of the MMTSR device 202, the server devices 204(1)-204(n), or the client devices 208(1)-208(n) may operate on the same physical device rather than as separate devices communicating through communication network(s) 210. Additionally, there may be more or fewer MMTSR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the internet, intranets, and combinations thereof.

Figure 3:
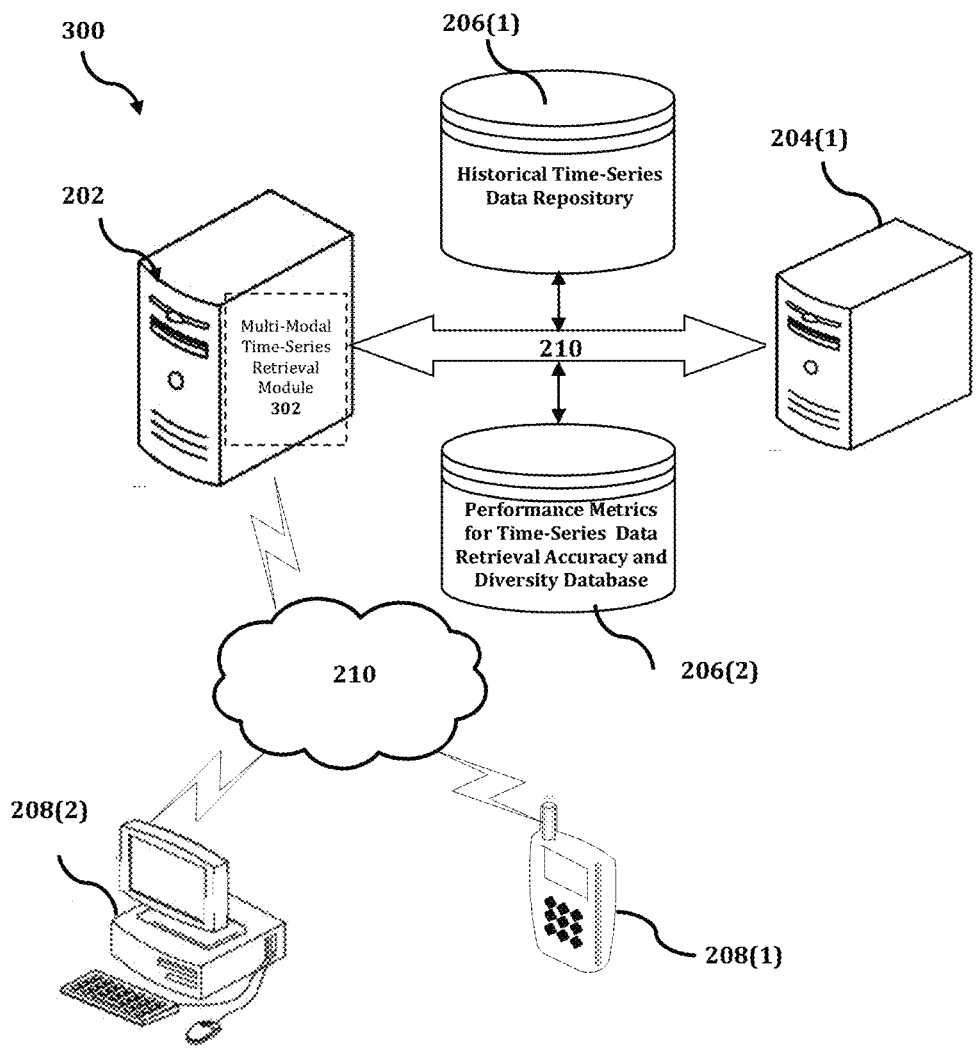
FIG. 3 shows an exemplary system for implementing a method for using multi-modal time-series data retrieval through latent space projections to efficiently capture and store time-series data.

The MMTSR device 202 is described and illustrated in FIG. 3 as including a multi-modal time-series retrieval module 302, although it may include other rules, policies, modules, databases, or applications, for example. As will be described below, the multi-modal time-series retrieval module 302 is configured to implement a method for using multi-modal time-series data retrieval through latent space projections to efficiently capture and store time-series data.

An exemplary process 300 for implementing a mechanism for using multi-modal time-series data retrieval through latent space projections to efficiently capture and store time-series data by utilizing the network environment of FIG. 2 is illustrated as being executed in FIG. 3. Specifically, a first client device 208(1) and a second client device 208(2) are illustrated as being in communication with MMTSR device 202. In this regard, the first client device 208(1) and the second client device 208(2) may be "clients" of the MMTSR device 202 and are described herein as such. Nevertheless, it is to be known and understood that the first client device 208(1) and/or the second client device 208(2) need not necessarily be "clients" of the MMTSR device 202, or any entity described in association therewith herein. Any additional or alternative relationship may exist between either or both of the first client device 208(1) and the second client device 208(2) and the MMTSR device 202, or no relationship may exist.

Further, MMTSR device 202 is illustrated as being able to access a historical time-series data repository 206(1) and a performance metrics for time-series data retrieval accuracy and diversity database 206(2). The multi-modal time-series retrieval module 302 may be configured to access these databases for implementing a method for using multi-modal time-series data retrieval through latent space projections to efficiently capture and store time-series data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MMTSR device 202 via broadband or cellular communication. Of course, these embodiments are merely exemplary and are not limiting or exhaustive.

Upon being started, the multi-modal time-series retrieval module 302 executes a process for using multi-modal time-series data retrieval through latent space projections to efficiently capture and store time-series data. An exemplary process for using multi-modal time-series data retrieval through latent space projections to efficiently capture and store time-series data is generally indicated at flowchart 400 in FIG. 4.

Figure 4:
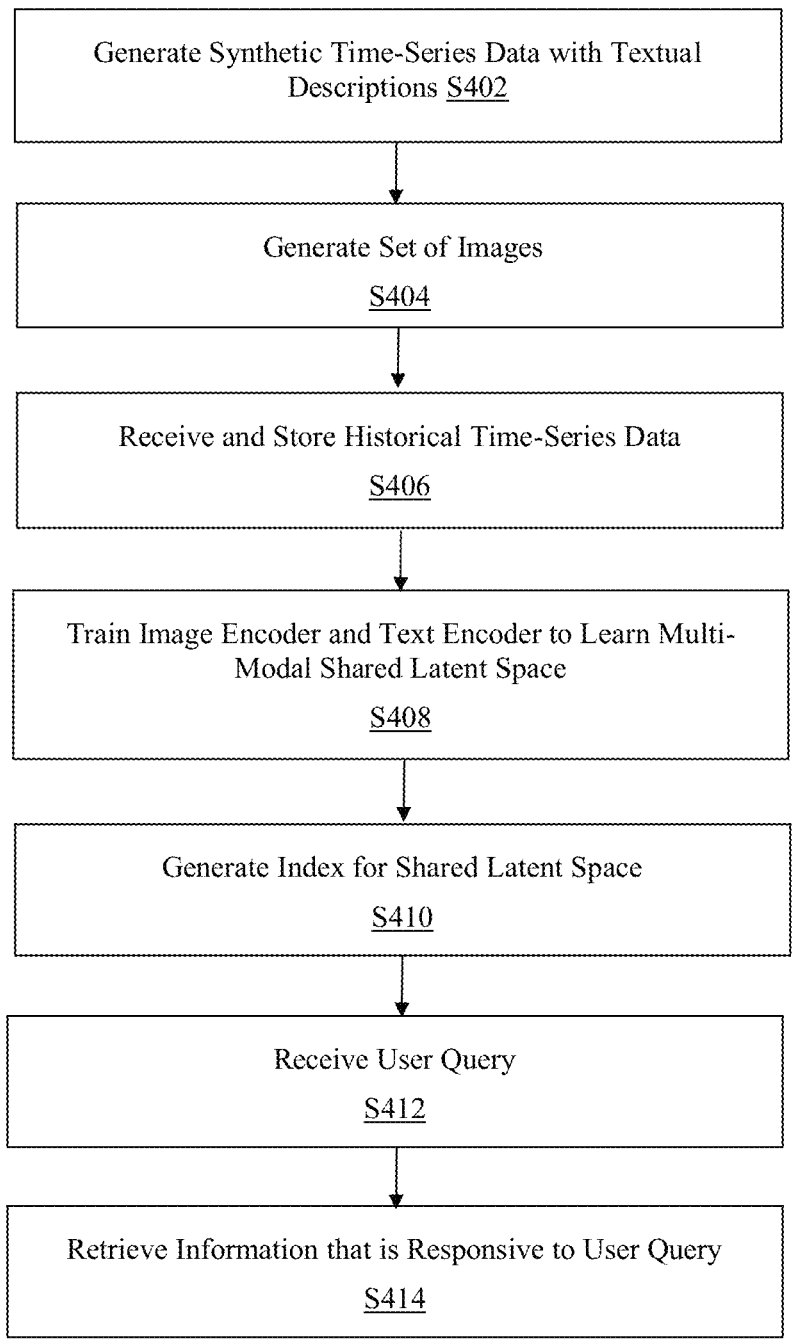
FIG. 4 is a flowchart of an exemplary process for implementing a method for using multi-modal time-series data retrieval through latent space projections to efficiently capture and store time-series data.

In process 400 of FIG. 4, at step S402, the multi-modal time-series retrieval module 302 generates a synthetic set of time-series data, together with a corresponding set of textual descriptions. In an exemplary embodiment, the generation of the synthetic set of time-series data includes characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

In an exemplary embodiment, the generation of the corresponding set of textual descriptions is performed by associating a respective numerical value of each parameter that is used to characterize the synthetic data with a corresponding descriptive sentiment. In an exemplary embodiment, each respective descriptive sentiment is retrievable from a first dataset, which is generated by inputting, into a first large-language model (LLM), a set of sentences within which at least one parameter is paired with a predetermined descriptive sentiment, together with a request for the first LLM to generate phrases that are semantically similar to each respective sentence included in the plurality of predetermined sentences. An output from the first LLM that includes a response to the request is then used to populate the first dataset.

For example, the set of sentences may include any one or more of a first sentence within which a near-zero numerical value for the fourth parameter that relates to the trend value is paired with at least one from among "neutral", "horizontal", "non-increasing", "flat", "stable", and "unchanged"; a second sentence within which a positive numerical value for the fourth parameter that relates to the trend value is paired with at least one from among "upward", "growing", "positive", "increasing", "rising", "climbing", and "advancing"; and a third sentence within which a negative numerical value for the fourth parameter that relates to the trend value is paired with at least one from among "declining", "falling", "sliding", "sinking", "plummeting", and "downward" As another example, the set of sentences may also include any one or more of a fourth sentence within which a relatively high numerical value for the third parameter that relates to the covariance of random noise added to the corresponding time-series is paired with at least one from among "has strong variability", "has significant variations", "has aggressive variations", "is unstable", "has high fluctuation", "is noisy", and "is variable"; and a fifth sentence within which a relatively low numerical value for the third parameter that relates to the covariance of random noise added to the corresponding time-series is paired with at least one from among "has small volatility", "has slight variability", "has negligible volatility", "has low volatility", and "remains stable".

At step S404, the multi-modal time-series retrieval module 302 uses the synthetic set of time-series data to generate a corresponding set of images. Then, at step S406, the multi-modal time-series retrieval module 302 receives a set of historical time-series data and then stores the historical time-series data in a database.

At step S408, the multi-modal time-series retrieval module 302 uses the images generated in step S404 and the historical time-series data received in step S406 to train an image encoder to learn a multi-modal shared latent space, and the multi-modal time-series retrieval module 302 also uses the set of textual descriptions to train a text encoder to learn that same multi-modal shared latent space. Then, at step S410, the multi-modal time-series retrieval module 302 generates an index that relates to the multi-modal shared latent space, such that the index is usable for identifying information stored in the database. In this aspect, as new historical time-series data is collected, the index may be updated based on newly collected historical time-series data.

At step S412, the multi-modal time-series retrieval module 302 receives a query from a user that relates to a new set of time-series data. In an exemplary embodiment, the user query may be in the form of a text-based query that includes words, i.e., a sentence or a phrase or a question. Alternatively, the user query may be in the form of a drawing that is generated by the user, such as a hand-drawn sketch or a computer-generated drawing.

In an exemplary embodiment, the user query includes first information that relates to a trend associated with the new set of time-series data and/or second information that relates to a volatility associated with the new set of time-series data. For example, the new set of time-series data may include stock price data over a predetermined interval of time, and it may include information that indicates both a trend of the stock price and a volatility of the stock price over that same interval of time. In an exemplary embodiment, when the user query is in the form of a drawing, the drawing may include a graphical depiction that illustrates the trend and/or the volatility associated with the new set of time-series data.

At step S414, the multi-modal time-series retrieval module 302 uses the trained image encoder, the trained text encoder, and the index to retrieve information that is responsive to the user query. In an exemplary embodiment, the image encoder and the text encoder are trained to recognize the newly introduced set of time-series data, and the index is then usable for searching through the database to find similar data that has been associated with corresponding textual descriptions and images, which may then be used to provide a response to the user query.

The increasing usage of data-hungry applications, including AI/ML algorithms, has brought significant changes to storage systems required to accommodate the growing volume, velocity, variety of data and queries. In particular, financial firms are required to process and store billions of time-series (TS). These TS are stored to satisfy compliance requirements, to provide business and clients with historical data, and to support data-driven algorithms. Such TS are frequently accessed with varying requirements, and correspondingly, queries. To support efficient data storage and retrieval, specialized TS databases and systems have emerged. While such databases support efficient indexing and querying of TS, they do not directly target two important aspects of financial TS: the intrinsic complexity of high-frequency financial data; and the required retrieval modalities and difficulty for the end users. In fact, such databases commonly offer queries based on some fixed set of properties and using Structured Query Language (SQL)-style queries; for example, "Stocks with daily price returns ≤5%". However, statistical properties of real price series can be non-trivial and challenging for users to express in such rigid formats. Therefore, financial users would require a fast and easy range of query modalities that facilitate the input of financial TS features, called stylized facts (e.g., volatility or correlation).

Some academic work proposes methods to: analyze and retrieve massive heterogeneous datasets; manage TS data streams from Internet of Things (IoT) devices; or find uncommon and interesting patterns with respect to historical databases. However, such works focus on specific applications or problems; they do not target or apply to financial TS, which have their own specific statistical properties and requirements.

Motivated by the lack of dedicated solutions for the financial domain, and by leveraging the recent advancements in machine-learning techniques, the present disclosure provides a description of a framework for efficient and easy multi-modal TS retrieval using latent space projections for financial TS. In particular, the present disclosure describes a framework for using Deep Encoder Networks for storing and retrieving financial TS data across different modalities, and retaining finance-pertinent information in the latent space. This approach enables one to learn a shared embedding space between multi-modal data (e.g., text to TS), and allows retrieval to be carried out using different query-modes, such as, for example, natural language, TS sketches, images, etc. A learned embedding space is used to index the historical TS data, i.e., a database of <encoding, historical data> is created. The database can then be used to retrieve TS using the different input modalities, and these methods may then be evaluated by using real historical data and synthetic data. The framework is demonstrable in two instances of the general approach of using deep encoders; one for queries by natural language (i.e., text-based retrieval), and one for queries by sketches of TS (i.e., sketch-based retrieval). In an exemplary embodiment, a user can search historical TS by providing a textual query, such as, for example, "A stock with high volatility and increasing price". Alternatively, one can draw the general sketch of the TS as a search input, as it is often the easiest to visualize a trend of the TS of interest.

In an exemplary embodiment, the text-based retrieval method leverages a pre-trained language encoder and a pre-trained visual encoder to combine visual and textual features, whose latent space are aligned using cosine similarity in the fine-tuning phase. In order to incorporate sketch-based functionality, in an exemplary embodiment, the second model uses autoencoders to encode a TS sketch and the volatility trend seen in the sketch into a latent-space, so subsequent queries can be matched with more than just the trend information. This is not limited to just volatility, but extensible to different properties of price TS data.

Problem Description: In an exemplary embodiment, the TS space is defined as $\chi=R^L$, where Z is the length of each TS. The problem focuses on the retrieval of TS from a large input dataset $D=\{x^i\}_{i=1}^N$ of N time series ($x^i \in \chi$, $i \in [1 \ldots N]$), using different modalities. Formally, the goal is to learn a function $f$ ($q \in \chi$, D, k)$\rightarrow R \subset D$ that, given an input query q, retrieves the best k matching TS from D. For example, a text based input "A stock with high volatility and increasing price" should retrieve a TS with such described statistical properties. In particular, financial TS have specific statistical properties; in particular, price series data has non-trivial properties that emerge from the mechanisms of individual actions and interactions in market micro-structure. Such statistical properties are often referred to as stylized facts. These can be challenging to express with existing query frameworks for TS data. In an exemplary embodiment, one objective is to support efficient and intuitive query modalities to enable users to retrieve TS that match not just the trend but also financially-relevant properties, such as price volatility. Most importantly, the problem of multi-modal retrieval is tackled, in order to empower users to retrieve TS using different types of inputs, such as, for example, text, sketches, images, and more.

Dataset Construction-Synthetic Stock Price Time Series Dataset: There are no existing datasets that have financial TS paired with corresponding textual descriptions. This type of dataset is crucial to train a text-based retrieval model that can effectively extract meaningful information and establish a connection between these two data types. Therefore, it is possible to generate synthetic TS and their corresponding textual descriptions by simulating stock prices, for example by using deep generative models. In an exemplary embodiment, to generate synthetic stock data, advantageous use is made of the discrete mean-reverting TS, which is frequently used to model financial markets as well as biological processes and is described by the equations below:

$$r_t = \max\{0, \kappa \bar{r} + (1 - \kappa)r_{t-1} + u_t\}, r_0 = \bar{r},$$

where $\bar{r}$ is a mean value of the TS, $\kappa$ is a mean-reversion parameter and $u_t \sim N(0, \sigma^2)$ is random noise added to the TS at each time step t. Stock directionality and a possibility of a large shock occurrence are included in the above generating process by introducing the concepts of trend and megashocks. Trend T is added to $r_t$ at each time step t to indicate the incline or decline of the stock value. Megashocks are intended to represent the exogenous events that occur infrequently and can have significant impact on the generating process. Mathematically, megashocks can arrive at any time t with probability of occurrence p, and are drawn from N (0, $\sigma_{shock}^2$) where $\sigma_{shock} >> \sigma$. Once the time series are generated, in an exemplary embodiment, they are converted into 224×224 images by plotting on a pre-defined domain. Various different approaches may be employed for auto-generation of captions.

Unfiltered: In an exemplary embodiment, the numerical value of each parameter r, $\kappa$, $\sigma$, T, p, $\sigma_{shock}$ is associated with a sentiment that describes it. For instance, near-zero values of trend T can be described as "neutral, horizontal, non-increasing, flat, stable, unchanged"; larger positive values of T can be described as "upward, growing, positive, increasing, rising, climbing, advancing"; and smaller negative values of T can be described as "declining, falling, sliding, sinking, plummeting, downward". Similarly, for high values of $\sigma$, the stock price TS can be described as "has strong variability", "has significant variations", "has aggressive variations", "is unstable", "has high fluctuation", "is noisy", and/or "is variable"; whereas, for the low values of $\sigma$, the generated TS can be labeled as "has small volatility", "the stock shows a slight variability", "the stock has negligible volatility", "has low volatility", and/or "the price remains stable". In an exemplary embodiment, for a given image, a sample is taken from a list of 3-5 semantically similar phrases to generate a specific phrase for each corresponding ground truth regime; then, each chosen feature phrase is then concatenated to give the final ground truth caption.

Filtered: Due to the stochasticity and inter-dependence between parameters in the synthetic model, auto-generation of captions based on parameter value in some instances leads to surprising captioning results relative to expectations based on a simple "eye-test". This effect has been found to be particularly prominent in higher volatility settings. In order to ensure consistency in captioning, a post-process filtering step may be performed, in which generated TS are re-labeled in trend and shock probability regimes that are dependent on mathematically pre-defined conditions. For the trend, a linear curve is fitted to the series, and the appropriate regime is evaluated based on the fitted gradient with respect to a threshold value. For shock regime filtering, an evaluation is performed with respect to the gradient of the generated TS at each point and the shocked regime is then assigned based on the presence of any gradient values above a threshold magnitude.

In an exemplary embodiment, for the historic dataset, the filtering process is extended to also include a volatility post-processing check. In this case, the volatility regime is assigned based on the average deviation with respect to the running TS value. This has been found to give more consistent captioning than the traditional volatility definition in finance which uses the standard deviation of returns.

Filtered-Plus: Given that the number of hand-crafted text descriptions for each configuration of parameters is limited, in an exemplary embodiment, the text descriptions may be augmented by using a large-language model (LLM) such as, for example, ChatGPT. For example, this may be executed by feeding ChatGPT a few pre-defined sentences for each feature regime, and asking it to generate a large number of semantically similar phrases. These may then be saved to text files from which alternative captions may be drawn. In total, this procedure may augment the dataset by approximately 60-80 phrases for each feature regime, thereby increasing the total number of phrases from 36 to over 500. This, in turn, enables a corresponding increase in the size of the TS dataset and reduces the possibility of overfitting. Due to the synthetic nature of the dataset creation, it is possible to easily scale up to larger dataset sizes, going from 4000 to 16000 samples for training.

It is well known that low liquidity stocks have high volatility, while high liquidity stocks have low volatility. Therefore, the captioning of the dataset generated above may be expanded to differentiate between "high liquidity" and "low liquidity" stocks based on their volatility profiles. In addition, in an exemplary embodiment, it is noted that the format of the caption attached to each image is a comma-separated statement about each feature of interest.

Historical Price Time Series Dataset: For the text-based retrieval method, historical stock data has been collected from Yahoo Finance using the open-source Python package. The stock tickers selected include GOOG, AMD, INBX and DAWN for high volatility, medium volatility, low volatility, and low volatility regimes respectively. A dataset of TS with 60 timesteps has been constructed, using overlapped sampling with a specified window size. For the smaller dataset, only GOOG, AMD and INBX stocks have been used to give 1500 TS in total; while for the larger dataset, the additional DAWN data is also included for the low volatility setting, and the window size is modified to double the number of TS to 3000. As with the synthetic dataset, in an exemplary embodiment, assigned captions are comma-separated statements about each feature of interest, and TS are converted to 224×224 images through plotting using a fixed format.

For the sketch-based retrieval method, stock data for GOOG, AMD, and INBX has been collected, with each trace of being of length 30, which corresponds to one month, and successive traces are obtained in increments of 5 time-steps. The dataset has 1516 traces, which has been found to be sufficient to show the relative performance costs between baseline methods and the use of an autoencoder (AE).

Figure 5:
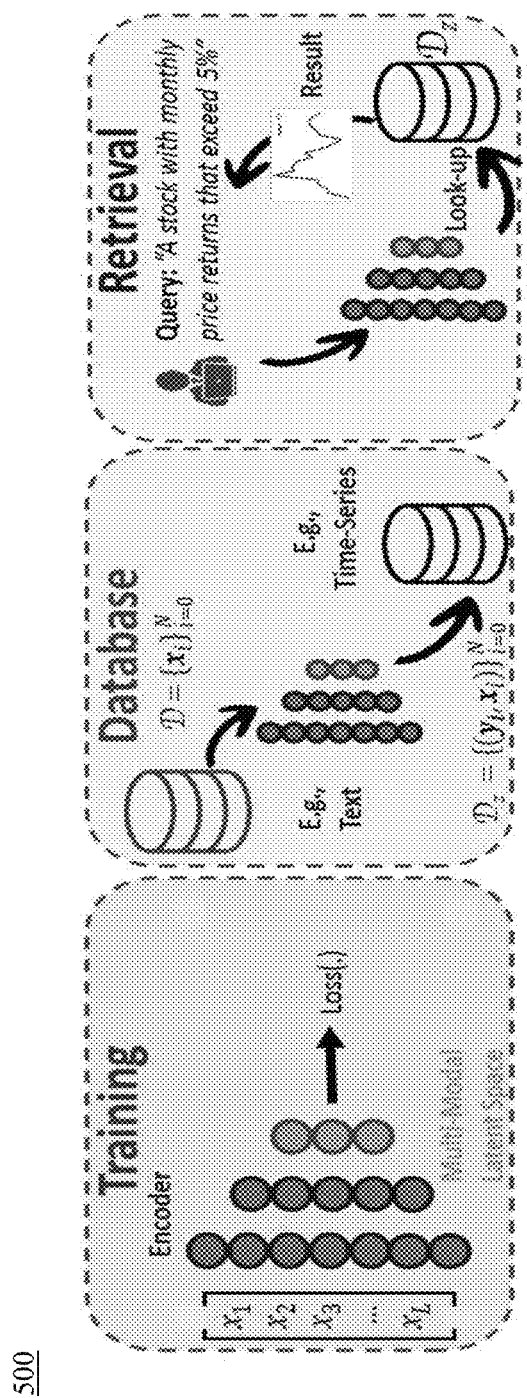
FIG. 5 is a diagram that illustrates a model architecture for implementing a method for using multi-modal time-series data retrieval through latent space projections to efficiently capture and store time-series data, according to an exemplary embodiment.

Methodologies: In an exemplary embodiment, an approach for text-based retrieval and sketch-based retrieval of TS are described below. FIG. 5 is a diagram 500 that illustrates a model architecture for implementing a method for using multi-modal time-series data retrieval through latent space projections to efficiently capture and store time-series data, according to an exemplary embodiment. In particular, FIG. 5 shows the overall framework. As illustrated in diagram 500, the use of deep encoder networks that are trained to learn a multi-modal shared latent-space is proposed. Such latent-space projection is learned to enable the translation between different modalities, and thus retrieval of TS from different query modalities, as illustrated in the Training panel at the left portion of FIG. 5. It is then possible to create a dedicated database, indexed using such latent-space projections, which is then later usable to enable user queries, as illustrated in the Database panel at the center portion of FIG. 5. By training encoders to project different input modalities to the same latent space in which the target database TS are stored, it is possible to support diverse query modes, such as text, images, and sketches, and thus retrieve matching TS, as illustrated in the Retrieval panel at the right portion of FIG. 5.

Text-based retrieval: In an exemplary embodiment, in the text-based retrieval method, the model allows users to perform TS retrieval via natural language descriptions of desired properties.

Architecture: To support retrieval functionality across different modes of data, it is required to employ an approach to learn consistent representations across modalities. To do this, the Contrastive Language-Image Pre-training (CLIP) model is used as the deep encoder, and it leverages a set of uni-modal, neural net encoders, pre-trained on large, generalized datasets. The encoders output variable-sized feature representations of their input data, which corresponds to a description of a given TS in the relevant modality. These feature representations are then inputted into a single layer projection head, which transforms the representations to a consistent dimensionality, as well as allowing fine-tuning through parameter updates during training. Taken together, a contrastive loss may then be used to learn a shared space across the different modalities.

In an exemplary embodiment, an advantage of this model is that for a given entry in the database, the embeddings output by the encoder remains fixed. This means these embeddings can be saved to a look-up table after first evaluation. On retrieval, the single query embedding is calculated and cosine similarities calculated very quickly on-the-fly in a single vectorized operation, which speeds up the retrieval calculation significantly.

For this text-based retrieval method, it is required to project TS data and natural language text into the same space. This is accomplished by encoding TS data as images, and embedding it in the same space as the text. In an exemplary embodiment, two encoders are employed for this purpose.

Image Encoder: By representing the TS data as images, it is possible to leverage the capabilities of the pre-trained deep convolutional neural networks (CNN) which have shown remarkable performance on image-based learning tasks. In an exemplary embodiment, the readily-available ResNet model is used. Its architecture consists of a series of residual blocks, where each block corresponds to a small CNN followed by an element-wise addition with the input, thus learning residual functions, implemented via a skip connection. This aids the stability of the optimization process with residual functions being easier to learn than unreferenced functions, and allows a depth of network previously unseen in computer vision. Multiple variants of ResNet exist dependent on their depth; in an exemplary embodiment, the ResNet50 model is used, which is made up of 50 layers and strikes a compromise between computational efficiency and model performance. The model has been trained on the ImageNet classification dataset, which consists of 1.28 million training images separated into 1000 classes. It takes as input a 224×224 pixel image, and outputs a corresponding 2048-dimensional vector representation.

Text Encoder: In an exemplary embodiment, for the text encoding, advantageous use is made of Sentence Bidirectional Encoder Representations from Transformers (i.e., Sentence-BERT), which aims to learn semantically meaningful sentence embeddings, through its sentence transformer models which map collections of words (i.e., sentences and paragraphs) to individual embeddings, using a combination of Siamese networks and triplet loss. The model is an alternative to the more widely-known BERT, and one difference between the two is that Sentence-BERT carries out tokenization at the sentence-level rather than the original word/sub-word based approach. Through this architecture, the model is able to learn text embeddings in which semantically similar sentences are close together. In an exemplary embodiment, a pre-trained Sentence-BERT model is used, which has been initialized on an English Wikipedia dataset of over 2500 million words, through the underlying pre-trained BERT models, and further fine-tuned for meaningful sentence-level embeddings through the Stanford Natural Language Inference (SNLI) and Multi-Genere NLI datasets.

Training: In an exemplary embodiment, the encoders are trained as described below. For a given batch of images, caption pairs and their corresponding embeddings v and t, a calculation of the scaled cosine similarity between all image-text pairs is performed by using the following expression:

$$S \equiv S(t, v^T) = \frac{t \cdot v^T}{\tau},$$

This expression provides an evaluation of the closeness S of the respective modalities of data in embedding space. The respective uni-modal similarity for each element is then calculated as follows:

$$S(t, t^T) = \frac{t \cdot t^T}{\tau} \text{ and } S(v, v^T) = \frac{v \cdot v^T}{\tau},$$

which are averaged over to give the target similarity based on the following expression:

$$S_{target} = \text{softmax}\left(\frac{S(t, t^T) + S(v, v^T)}{2\tau}\right).$$

The final loss L is calculated averaging over the cross-entropy between each uni-modal embedding and this target similarity, based on the following expression:

$$\mathcal{L} = \frac{\mathcal{L}_{CE}(S, S_{target}) + \mathcal{L}_{CE}(S^T, S^T_{target})}{2}.$$

This loss acts to drive the embedded space of each modality to a consistent, shared space. Note that the scaling parameter r (temperature) used in the above calculation is used to scale the similarities such that the sharpness of their predictions can be tuned during validation. In an exemplary embodiment, 10% of each dataset is held out during training for validation.

Sketch-based retrieval: In an exemplary embodiment, the sketch-based retrieval functionality enables users to draw a TS, and retrieve a similar one based on the drawn trend and the properties in the sketch. While the sketch-based approach can incorporate any statistical property $\xi(x)$ in the trend into the search, for simplicity of discussion, a focus is placed only on search that incorporates price volatility from the sketch, in addition to matching the price trend. The standard deviation of prices is used as the measure of volatility. Volatility information is incorporated into the latent space by computing an additional TS associated to the desired property; the volatility is computed in a fixed window of the input TS, and slide the window across the original TS to generate a new "volatility TS". By doing this, it is possible to use the same encoding architecture used on the original TS. This idea of displaying information in derived TS is seen in analytics for finance with properties like moving averages, and Relative Strength Index (RSI). This is applied in order to encode and store such information. In this way it may be explicitly preserved into the latent space for informing subsequent database retrieval. This provides a general way of storing other such properties ($\xi(x)$) that can be computed from the TS.

Training: In an exemplary embodiment, all input historical TS x are normalized to be between [0, 1] using a min-max scaler. Additionally, given a TS x, its price volatility is defined in terms of a new TS $v \in [0, 1]^{[L]}$ where each data point $j \in vi$ is the volatility of the neighboring 2*m points (in an exemplary embodiment, m=4):

$$vi = \sigma(x_{i-m:m+i})$$

The price trend (original) TS is referred to as simply "TS", and the price volatility TS computed from it is referred to as volatility-TS.

For searching based on the trend and the volatility, in an exemplary embodiment, two identical and separate fully-connected auto-encoders are trained for the TS and volatility-TS. To incorporate the trend information, training is performed on a classic fully-connected autoencoder (AE) $E_t$ (x) that encodes the TS x into the latent-space with the following reconstruction loss:

$$\min_{i \in D} |x_i - \bar{x}_i|_2^2$$

where x is the reconstructed TS. To include volatility information into the search, training is also performed on another deep AE $E_v$ (v) to encode v into the latent-space, with a similar reconstruction loss:

$$\min_{i \in D} |v_i - \bar{v}_i|_2^2$$

where x is the reconstructed volatility TS.

In an exemplary embodiment, the overall encoder E for the sketch-based retrieval simply concatenates and normalizes the embeddings from $E_t$ (x) and $E_v$ (v). With respect to the network structure of the AE, the input size is 30, and there are three hidden layers in the encoder of size 512, 256, and 16; the last layer is the latent space of size 16. The latent space is normalized before decoding in the AE using the same structure as the encoder albeit in reverse. All layers include trainable bias weights, and all layers use Rectified Linear Unit (ReLU) as the non-linearity function, except for the last layer of the decoder which does not include ReLU computation.

Database: In an exemplary embodiment, for the database construction, the AE output (i.e., latent space) is computed for each TS $x_i \in D$. In particular, for each TS, it is possible to compute its embedding e, being the concatenation of $E_t$ (xi) and $E_v$ (vi), and then store the embedding into a database structure. The database maintains the embedding and original TS<e, x> to facilitate a subsequent efficient search. In an exemplary embodiment, advantageous use is made of Facebook AI Similarity Search (FAISS), which is a library for very fast searching over vector spaces, for indexing and lookup.

Retrieval: In an exemplary embodiment, to retrieve TS using trend and volatility information in the input TS, the AE is used to generate a query vector to search the FAISS index. Given a user sketch that contains a trend x, the volatility TS v is computed, and then the embedding e⁻ for the query is computed using the encoders. This embedding is then usable to efficiently retrieve a subset of TS $x_i \in D$ whose cosine similarities are the highest in the database.

In an exemplary embodiment, it has been shown that these encoders preserve information for both trend and volatility. Most importantly, while existing consumer TS databases require the user to specify a rigid definition for matching properties such as a trend approximation (e.g., second-degree polynomial), it has been found that the autoencoders naturally approximate and match any trend in the input sketch TS. This provides not only a faster retrieval mode, but also more flexibility to the end user.

Evaluation Measures-Text-Based Retrieval Measures: In an exemplary embodiment, three metrics are utilized to determine performance, with evaluation carried out on the validation set of unseen TS images for both in-sample (i.e, used during training) and out-of-sample queries. Each query is a single statement about a particular feature, with a roughly equal number of queries for each regime. In an exemplary embodiment, retrieval accuracy is evaluated by using Rank@9. This is recorded for both in-sample and out-of-sample settings. In addition, a definition is provided for a diversity metric, which measures the number of distinct TS images returned across all queries relative to the total number of images returned. In this aspect, a higher measure of diversity implies that a greater fraction of images in the database are able to be retrieved through prompt variation. For this metric, the aggregated value is recorded across both querying settings.

Sketch Based Retrieval Measures: In an exemplary embodiment, to evaluate the sketch-based retrieval method, TS queries are automatically generated as stand-ins for sketch TS by using 302 TS queries from the test-set, which is not provided during training to the AE. To these, additive noise is provided, and a circular shift to the right by five steps is also added in order to generate TS that are less similar to training data, and a query for best matches is submitted. For evaluating the retrieval performance of each method, consideration is given to measures that match the query sketch with the returned TS. In an exemplary embodiment, the measures which have been computed in order to compare the performance between baselines and AE are as follows: (1) Mean Absolute Percentage Error (MAPE) between the trend and retrieved TS. This computes the average ratio between point-wise error and the true value. Note that this may be displayed as a ratio, and not as a percentage. For each method, this value is averaged over all the test queries, i.e., all top-k results returned per query (where top-k could be the top three results, for example). (2) Pearson's Correlation coefficient (CORR), which is between [−1, 1], and measured between the query TS and retrieved TS. The retrieval performance measures are averaged over all of a set of test queries. (3) Computational Time, including mean and standard deviation, which is computed over all queries. This time includes the time taken to compute the embedding of each query if the method requires an embedding.

Accordingly, with this technology, a process for using multi-modal time-series data retrieval through latent space projections to efficiently capture and store time-series data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for using multi-modal time-series data retrieval through latent space projections to capture time-series data, the method being implemented by at least one processor, the method comprising:
   generating, by the at least one processor, a synthetic set of time-series data and a corresponding set of textual descriptions;
   generating, by the at least one processor, a respective set of images by using the synthetic set of time-series data;
   training, by the at least one processor, an image encoder to learn a first multi-modal shared latent space by using the images;
   training, by the at least one processor, a text encoder to learn the first multi-modal shared latent space by using the textual descriptions;
   receiving, by the at least one processor, historical time-series data and storing the historical time-series data in a database;
   generating, by the at least one processor, an index that relates to the first multi-modal shared latent space and is usable for identifying information stored in the database;
   receiving, from a user by the at least one processor, a query that relates to a first new set of time-series data; and
   retrieving, from the database by the at least one processor, information that is responsive to the query by using the image encoder, the text encoder, and the index,
   wherein the generating of the synthetic set of time-series data comprises characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

2. The method of claim 1, wherein the generating of the corresponding set of textual descriptions comprises associating a respective numerical value of each parameter with a corresponding descriptive sentiment.

3. The method of claim 2, wherein the corresponding descriptive sentiment is retrieved from a first dataset that is generated by inputting, into a first large-language model (LLM), a plurality of predetermined sentences within which at least one parameter from among the first parameter, the second parameter, the third parameter, the fourth parameter, the fifth parameter, and the sixth parameter is paired with a predetermined descriptive sentiment, together with a request for the first LLM to generate phrases that are semantically similar to each respective sentence included in the plurality of predetermined sentences; and using an output from the first LLM that includes a response to the request to populate the first dataset.

4. The method of claim 3, wherein the plurality of predetermined sentences includes at least one from among a first sentence within which a near-zero numerical value for the fourth parameter that relates to the trend value is paired with at least one from among "neutral", "horizontal", "non-increasing", "flat", "stable", and "unchanged"; a second sentence within which a positive numerical value for the fourth parameter that relates to the trend value is paired with at least one from among "upward", "growing", "positive", "increasing", "rising", "climbing", and "advancing"; and a third sentence within which a negative numerical value for the fourth parameter that relates to the trend value is paired with at least one from among "declining", "falling", "sliding", "sinking", "plummeting", and "downward".

5. The method of claim 3, wherein the plurality of predetermined sentences includes at least one from among a fourth sentence within which a relatively high numerical value for the third parameter that relates to the covariance of random noise added to the corresponding time-series is paired with at least one from among "has strong variability", "has significant variations", "has aggressive variations", "is unstable", "has high fluctuation", "is noisy", and "is variable"; and a fifth sentence within which a relatively low numerical value for the third parameter that relates to the covariance of random noise added to the corresponding time-series is paired with at least one from among "has small volatility", "has slight variability", "has negligible volatility", "has low volatility", and "remains stable".

6. The method of claim 1, wherein the query includes first information that relates to a trend of the first new set of time-series data and second information that relates to a volatility of the first new set of time-series data.

7. The method of claim 6, wherein the query includes at least one from among a text-based query that includes a plurality of words and an image-based query that includes a drawing that is generated by the user and includes a graphical depiction that illustrates the first information that relates to the trend of the first new set of time-series data and the second information that relates to the volatility of the first new set of time-series data.

8. The method of claim 1, wherein the first new set of time-series data includes stock price data.

9. A computing apparatus for using multi-modal time-series data retrieval through latent space projections to capture time-series data, the computing apparatus comprising:
a processor;
a memory; and
a communication interface coupled to each of the processor and the memory,
wherein the processor is configured to:
generate a synthetic set of time-series data and a corresponding set of textual descriptions;
generate a respective set of images by using the synthetic set of time-series data;
train an image encoder to learn a first multi-modal shared latent space by using the images;
train a text encoder to learn the first multi-modal shared latent space by using the textual descriptions;
receive, via the communication interface, historical time-series data and store the historical time-series data in a database within the memory;
generate an index that relates to the first multi-modal shared latent space and is usable for identifying information stored in the database;
receive, from a user via the communication interface, a query that relates to a first new set of time-series data; and
retrieve, from the database, information that is responsive to the query by using the image encoder, the text encoder, and the index,
wherein the processor is further configured to generate the synthetic set of time-series data by characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

10. The computing apparatus of claim 9, wherein the processor is further configured to generate the corresponding set of textual descriptions by associating a respective numerical value of each parameter with a corresponding descriptive sentiment.

11. The computing apparatus of claim 10, wherein the processor is further configured to generate a first dataset from which each corresponding descriptive sentiment is retrievable by inputting, into a first large-language model (LLM), a plurality of predetermined sentences within which at least one parameter from among the first parameter, the second parameter, the third parameter, the fourth parameter, the fifth parameter, and the sixth parameter is paired with a predetermined descriptive sentiment, together with a request for the first LLM to generate phrases that are semantically similar to each respective sentence included in the plurality of predetermined sentences; and using an output from the first LLM that includes a response to the request to populate the first dataset.

12. The computing apparatus of claim 11, wherein the plurality of predetermined sentences includes at least one from among a first sentence within which a near-zero numerical value for the fourth parameter that relates to the trend value is paired with at least one from among "neutral", "horizontal", "non-increasing", "flat", "stable", and "unchanged"; a second sentence within which a positive numerical value for the fourth parameter that relates to the trend value is paired with at least one from among "upward", "growing", "positive", "increasing", "rising", "climbing", and "advancing"; and a third sentence within which a negative numerical value for the fourth parameter that relates to the trend value is paired with at least one from among "declining", "falling", "sliding", "sinking", "plummeting", and "downward".

13. The computing apparatus of claim 11, wherein the plurality of predetermined sentences includes at least one from among a fourth sentence within which a relatively high numerical value for the third parameter that relates to the covariance of random noise added to the corresponding time-series is paired with at least one from among "has strong variability", "has significant variations", "has aggressive variations", "is unstable", "has high fluctuation", "is noisy", and "is variable"; and a fifth sentence within which a relatively low numerical value for the third parameter that relates to the covariance of random noise added to the corresponding time-series is paired with at least one from among "has small volatility", "has slight variability", "has negligible volatility", "has low volatility", and "remains stable".

14. The computing apparatus of claim 9, wherein the query includes first information that relates to a trend of the first new set of time-series data and second information that relates to a volatility of the first new set of time-series data.

15. The computing apparatus of claim 14, wherein the query includes at least one from among a text-based query that includes a plurality of words and an image-based query that includes a drawing that is generated by the user and includes a graphical depiction that illustrates the first information that relates to the trend of the first new set of time-series data and the second information that relates to the volatility of the first new set of time-series data.

16. The computing apparatus of claim 9, wherein the first new set of time-series data includes stock price data.

17. A non-transitory computer readable storage medium storing instructions for using multi-modal time-series data retrieval through latent space projections to capture time-series data, the storage medium comprising executable code which, when executed by a processor, causes the processor to:
generate a synthetic set of time-series data and a corresponding set of textual descriptions;
generate a respective set of images by using the synthetic set of time-series data;
train an image encoder to learn a first multi-modal shared latent space by using the images;
train a text encoder to learn the first multi-modal shared latent space by using the textual descriptions;
receive historical time-series data and store the historical time-series data in a database;

generate an index that relates to the first multi-modal shared latent space and is usable for identifying information stored in the database;

receive, from a user, a query that relates to a first new set of time-series data; and retrieve, from the database, information that is responsive to the query by using the image encoder, the text encoder, and the index, wherein when executed by the processor, the executable code further causes the processor to generate the synthetic set of time-series data by characterizing the synthetic set of time-series data with respect to each of a first parameter that relates to a mean value of a corresponding time-series, a second parameter that relates to a mean-reversion parameter of the corresponding time-series, a third parameter that relates to a covariance of random noise added to the corresponding time-series, a fourth parameter that relates to a trend value that is added to the corresponding time-series at a predetermined time interval, a fifth parameter that relates to a probability of an occurrence of a megashock with respect to the corresponding time-series, and a sixth parameter that relates to a covariance of the megashock.

* * * * *